Jan. 21, 1964  A. J. RICHARDS ETAL  3,118,216
APPARATUS FOR PRODUCING RODENT TRAPS
Filed July 1, 1960  7 Sheets-Sheet 2

INVENTORS.
Arthur J. Richards.
Harry C. Veryser.
BY
Elmer Jamison Gray
ATTORNEY.

Jan. 21, 1964　　A. J. RICHARDS ETAL　　3,118,216
APPARATUS FOR PRODUCING RODENT TRAPS
Filed July 1, 1960　　　　　　　　　　　　　　7 Sheets-Sheet 3

Fig. 8.

INVENTORS.
Arthur J. Richards.
Harry C. Veryser.
BY
Elmer Jamison Gray
ATTORNEY.

United States Patent Office 3,118,216
Patented Jan. 21, 1964

3,118,216
APPARATUS FOR PRODUCING RODENT TRAPS
Arthur J. Richards, Detroit, and Harry C. Veryser, Mount Clemens, Mich., assignors to Educational Models Inc., Birmingham, Mich., a corporation of Michigan
Filed July 1, 1960, Ser. No. 40,386
20 Claims. (Cl. 29—33)

This invention relates to an apparatus and method for assembling components of a rodent trap or the like and is particularly directed to the assembly of such components, the like parts of which are initially connected together in strip form.

A primary object of the invention is to provide for the automatic assembly of trap components with an intermittently moving, initially strip connected base or carrier element at successive part supply stations, each such component also being initially strip connected and severed from its strip as the base element moves to such station, the complete assembly being subsequently severed from the base element strip upon passing the last part station.

Another object of the invention is to provide an apparatus for the assembly of trap components which apparatus is inclusive of an elongated table or support for the base or carrier element and a series of component part supply stations arranged for the most part normal to the base support and from which the parts are intermittently supplied and assembled onto the base element, the supply stations being controlled by common actuating means timed to furnish and sever a component from an initial strip of such parts as the base element is advanced to each such station, the complete assembly being finally severed from the base element strip upon being completely assembled.

A further object of the invention is to provide for the method of assembling the components of a trap which method is inclusive of the steps of intermittently advancing and stopping a base or carrier element along an elongated guide, intermittently advancing and stopping component part strips along guides disposed at spaced intervals along such elongated guide, severing a component from its strip as the base element is stopped at such station, assembling the component onto the base strip after severing and subsequently severing a completely assembled device from the base strip.

Other objects of this invention will appear in the following description and appended claims, reference being had to the accompanying drawings forming a part of this specification wherein like reference characters designate corresponding parts in the several views.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now to the drawings, generally indicated at 20 is the trap mechanism assembly machine having a flat plate or table portion 22 supported by a plurality of legs 24. An electric motor 26 is mounted on a pad 28 that is adapted for movement on the base 30. A pulley 32 is mounted on the motor shaft 34 and is connected to pulley 36 by belt 38. Pulley 36 is attached to the input shaft 40 of a speed reducing apparatus 42. Apparatus 42 and base 30 are securely mounted to the portion 44 of the machine 20.

A screw threaded shaft 46 is attached to the pad 28 and turns in a threaded aperture 48 of the base 30. By rotating the shaft 46 by the wheel 50 the pad 28 can be moved to and from the aperture 48. The pulley 32 is of a type that automatically adjusts its effective diameter when the motor is moved by the screw shaft 46 whereby the speed of the pulley 36 is varied depending upon the distance between the two pulleys and the effective diameter the pulley 32 assumes as shown by the dot and dash lines generally indicated at 51.

A sprocket 52 is attached to the output shaft 54 of the apparatus 42. Chain 56 connects sprocket 58 to sprocket 52. Sprocket 58 is securely keyed to drive shaft 60 that extends the full length of the machine 20. A plurality of bearings 62 support the shaft to the underside of the plate 22.

By means of the variable diameter pulley, the speed reducer and the chain and sprockets, the speed of the shaft 60 can be varied to suit the requirements of the assembly apparatus. It has been found that a shaft speed of from two to four seconds per revolution is satisfactory for the operations performed. Suitable electric power lines and switch (not shown) are provided for operation of the motor.

The base of the trap mechanism, generally indicated at 64, is fabricated from a strip of metal on a press by means of a progressive type die. This base 64, which provides a continuous lower jaw member strips, is fed to one end of the machine 20 in a continuous strip 66. The operation of the press that is located adjacent the end of the machine is regulated so that the movement of the strip conforms to the advance of the strip through the machine.

Base 64 has a flat portion 68 and two side portions 70. An upturned portion 72 is adjacent one edge and notch 74 along the opposite edge. Slots 76 and 78 extend through portion 68. Struck out portions 80 and 82 extend upward from the flat portion. Round elongated springs 84 extend along the sides 70 and are securely held in place in slits 86. Each base is attached to adjacent bases by strips 88 and 90 which provide a continuous strip 66 forming a series of similar trapping jaw members joined together.

The lower jaw member base strip 66 is guided through the machine by guide block 92 that extends the full length of the machine. Portion 94 extends over both lateral edges of this strip to retain the strip in position. To advance the strip along the guide block, a cylindrical cam 96 (FIG. 2) is provided, which cam is secured to shaft 60 by means of the key 98. Cam groove 100 extends around the periphery of the cam, and the groove profile is developed to advance the strip during 120 degrees revolution of the cam by means of the cam follower 102 that is attached to lug 104 that extends downward from the push rod 106. A slot 108 is provided in block 92 and plate 22 for the lug 104.

Figure 6:
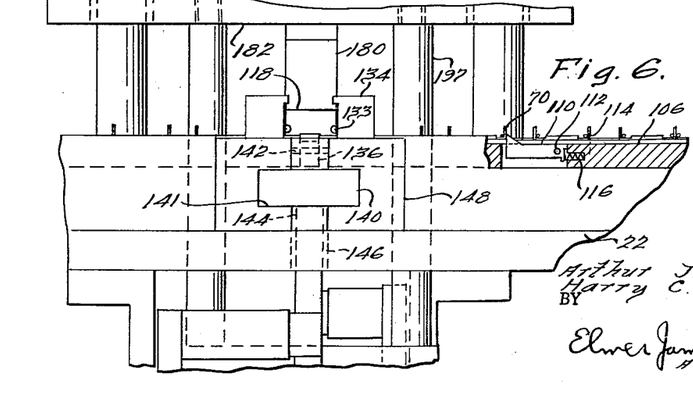
FIG. 6 is a side view of the apparatus shown in FIG. 5 partially in section and looking in the direction of the arrows.

Pawl 110 as best seen in FIG. 6 is attached to push rod 106 by pin 112 upon which is free is pivot. The pawl pushes against the side 70 of the base strip 66 and after advancing the strip, the pawl 110 is returned to a position against the side 70 of the following base element as shown by the dotted lines 114 during which time the strip 66 remains stationary. The profile of the cam groove 100 is developed to return the pawl during 240 degrees revolution of the drum. Spring 116 urges the pawl upward into position against the side of the base. A plurality of pawls 110 are positioned along the length of the push rod 106 to evenly distribute the pull on the strip.

Figures 5, 7:
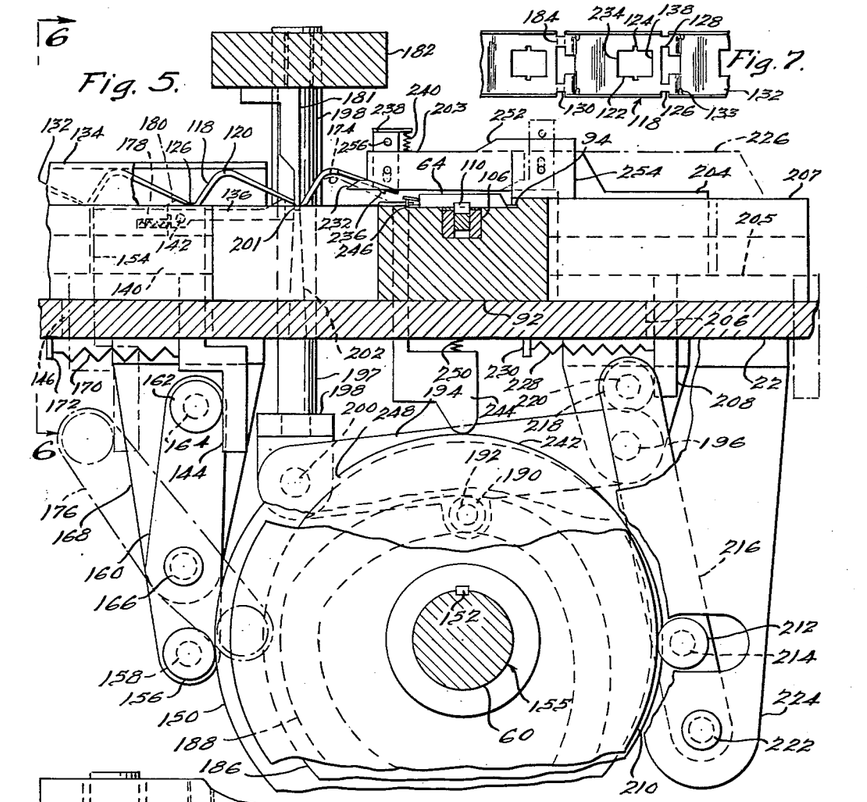
FIG. 5 is a sectional view partially broken away through the line 5—5 of FIG. 2 and looking in the direction of the arrows.
FIG. 7 is a plan view of the cover of the trap mechanism with the covers connected together in a partial strip.

FIG. 5 illustrates the mechanism from assembling the upper jaw member or cover 118 of the trap mechanism into position on the base 64. The cover or upper trapping jaw member is rounded as at 120 and is provided with a cut out 122. Slots 124 are positioned in the cut out for purposes later to be described. Notches 126 and cut out 128 are positioned in the flat portion of the cover. Portions 130 connect adjacent covers together to form the strip 132. Apertures 133, best seen in FIG. 6, are provided to receive the springs 84 of the base strip 66.

The cover or jaw member 118 is fabricated from a strip of metal on a press by means of a progressive die forming the strip 132. The operation of the press is the same as previously described for base 64. The strip is fed into the machine 20 from a press that is positioned adjacent the side of the machine.

The cover or upper jaw assembly station is located on the base along both sides of block 92. The strip 132 is advanced between the guide blocks 134 by the pawl 136 that pushes against the cover along surface 138 of the cut out 122. The pawl is attached to slide block 140 by pin 142 and is free to pivot on the pin. The slide block has a lug portion 144 that extends downward through the slot 146 in the plate 22. The block 140 slides in ways 141 provided by the guide block 148 secured to plate 22.

To move strip 132 between the guide blocks 134, cam 150 is provided. The cam is securely attached to the shaft 60 by the key 152, and moves the slide block 140 from an advanced position as shown in FIG. 5 to a retracted position as indicated by the dot and dash lines 154. The motor and drive mechanism is adapted to rotate the shaft 60 in the direction indicated by the arrow 155.

The cam 150 is positioned radially on the shaft 60 in timed relation to cam 96 and has its profile developed to advance the strip 132 at the same time base 64 is advancing. Cam follower 156 turns on shaft 158 that is attached to lever 160. Roller 162 acts against lug 144 and rotates on shaft 164 that is also attached to lever 160. The lever 160 pivots on pin 166, attached to a bracket 168, that is secured to plate 22 of the machine. The cam 150 provides positive motion to advance the slide block 140 and a spring indicated at 170 returns the slide block to its retracted position. The spring 170 has one end attached to the lug 144 and its opposite end attached to plate 22 through lug 172. After advancing the cover or upper jaw member 118 to the position indicated by the dot and dash lines 174 the cam profile allows the lever 160 to return to the retracted position as indicated by the dot and dash lines 176 by the pull of the spring 170. The pawl 136 returns with the slide block 140 and the spring 178 urges the pawl into abutment against the following cover as indicated at 180.

After the cover strip 118 is in position as indicated at 174, punch 181 attached to head 182 severs an upper jaw member from the strip by punching out the portions 130 as indicated by the dotted lines 184. Cam 186 has a groove 188 with a profile developed to move the head 182 downward and upward. The cam 186 is attached to shaft 60 and positioned radially on the shaft in timed relation to cams 150 and 96 and is attached in the same manner. Cam follower 190 rides in groove 188 and rotates on shaft 192. Shaft 192 is attached to lever 194 that pivots on pin 196. Lever 194 operates head 182 up and down through draw bars 197. The draw bars are connected to member 198 through pin 200, on which lever 194 pivots.

The slugs that are punched out fall through die opening 201 and slot 202 where they are carried away from the machine. At the bottom of the downward stroke as shown in FIG. 5 the profile of the cam groove allows the punch to dwell and act as a stop for the cover until pull rod 203 is in position.

The pull rod 203 is attached to slide block 204. Attached to the slide block and projecting downward through slot 206 is a lug 208. Cam 210 bears against cam follower 212 that rotates on shaft 214 attached to lever 216. Roller 218 rotates on shaft 220 that is also attached to lever 216 which in turn pivots on pin 222 that is attached to bracket 224 securely fastened to the plate 22. Slide block 204 moves on ways 205 provided by guide block 207 secured to plate 22.

Cam 210 is attached to shaft 60 and is positioned radially on the shaft in timed relation with cams 96, 150 and 186. When cam 96 begins to advance the base 64, pull rod 203 is in the position as indicated by dot and dash lines 226. It will be noted that the cam profile is developed and the lever 216 positioned in a manner that moves the pull rod 203 from the position shown by the full lines in FIG. 5 to the position indicated by the dot and dash lines 226 with the spring 228 moving the pull rod in the opposite direction. The spring 228 is attached to lug 208 on one end and to the plate 22 through a lug 230 on the opposite end.

After the base strip 66 has begun to advance, the cam 210 allows the spring 228 to move the pull rod 203 toward the upper jaw member or cover 118. Inclined surface 232 on the pull rod engages surface 234 on the cover and raises the cover. Projection 236 on the pawl 238 rides over a portion of the cover and drops into the cut out 122 through the action of the spring 240. At this time the base has stopped its advance and is in position to receive the cover. Cam surface 242 on the outside peripheral surface of cam 186 operates through cam follower 244 and the portion 246 to raise the springs 84 on the base into alignment with apertures 133. With the projection 236 bearing against the surface 138 of the cover the pull rod pulls the cover or upper jaw member into position on the base through the action of the cam. As the terminal ends of the springs 84 enter the apertures 133 the cam follower 244 causes the portion 246 to immediately drop down out of the way of the cover through the profile 248 of the cam and the force of the spring 250. As the travel of the pull rod 203 continues, surface 252 on guide member 254 engages pin 256 and raises projection 236 out of the cut out on the cover allowing the pull rod to withdraw from the cut out and the cover drops into position on the base. The pull rod stops its backward motion at the position shown by the dot and dash lines where it is ready to begin the next assembly cycle. After the pull rod has started to advance the cover toward the base, cam 186 moves punch 180 upwards to allow the following cover or jaw member to be advanced.

It will be understood that the profiles of the cams 96, 150, 186, 210 and 242 and the position of the cams on the drive shaft 60 in relation to each other operate the assembly mechanism with the motion and timing required to accomplish the operations as described.

Figure 8:
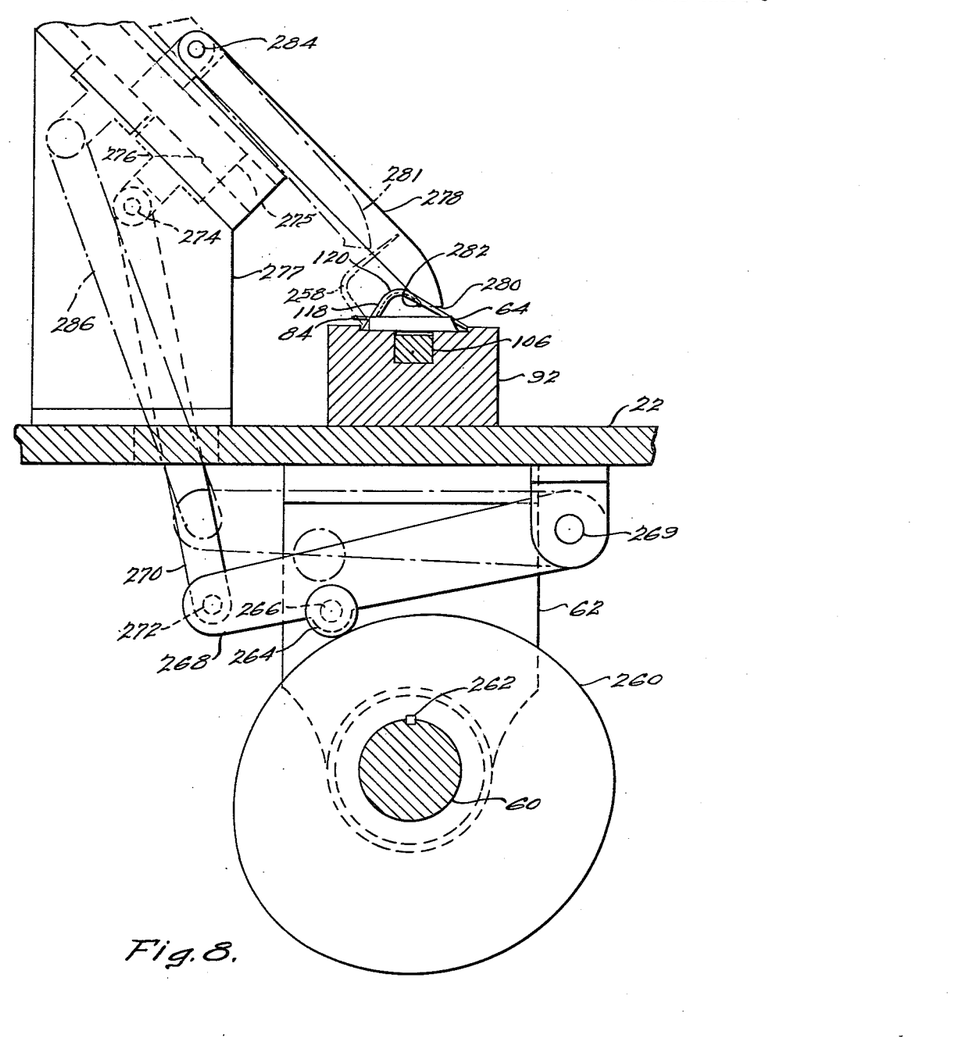
FIG. 8 is a section taken through the lines 8—8 of FIG. 2 looking in the direction of the arrows.

The cover 118 is in the position shown in FIG. 8 on the base when the base is moved to the second station of the machine that raises the cover to the position shown by dot and dash lines 258. This is accomplished through the cam 260 that is secured to the shaft 60 by the key 262. Cam follower 264 rotates on a shaft 266 secured to lever 268 which is pivoted on a pin 269. Arm 270 pivots on pin 272 and pin 274. Pin 274 is connected to slide 275 which moves on ways 276 provided by bracket 277 that is supported on plate 22. One end of the rod 278 has a surface 280 and a projecting portion 282. After the base with the cover has advanced to the second station rod 278 moves downward from the position shown by the dot and dash lines at 281 at which time the surface 280 contacts the rounded surface 120 of the cover causing the rod 278 to raise with the downward motion of the rod 278 continuing until projection 282 drops into cut out 122 of the cover with the rod pivoting on pin 284. The cam 260 operating through the cam follower levers and slide block, then causes rod 278 to move upward with projection 282 bearing against surface 234 of the cover to raise the cover to the position shown in the dot and dash lines 258 where the projection slips out of the cut out and the rod continues to its fully retracted position. The dot and dash lines 286 indicate the position of the lever mechanism corresponding to the dot and dash position of the rod. The weight of the rod 278 causes it to pivot downward on the pin by gravity. The cover is held in the raised position by the pressure of the springs 84 acting through the apertures 133 in the cover with the edge of the cover against the upturned portion 72 on the base. The profile of cam 260 and its relation to cam 96 on the shaft 60 operates the mechanism with the motion and timing necessary to accomplish the operation described.

Figures 11, 17, 18, 19, 20:
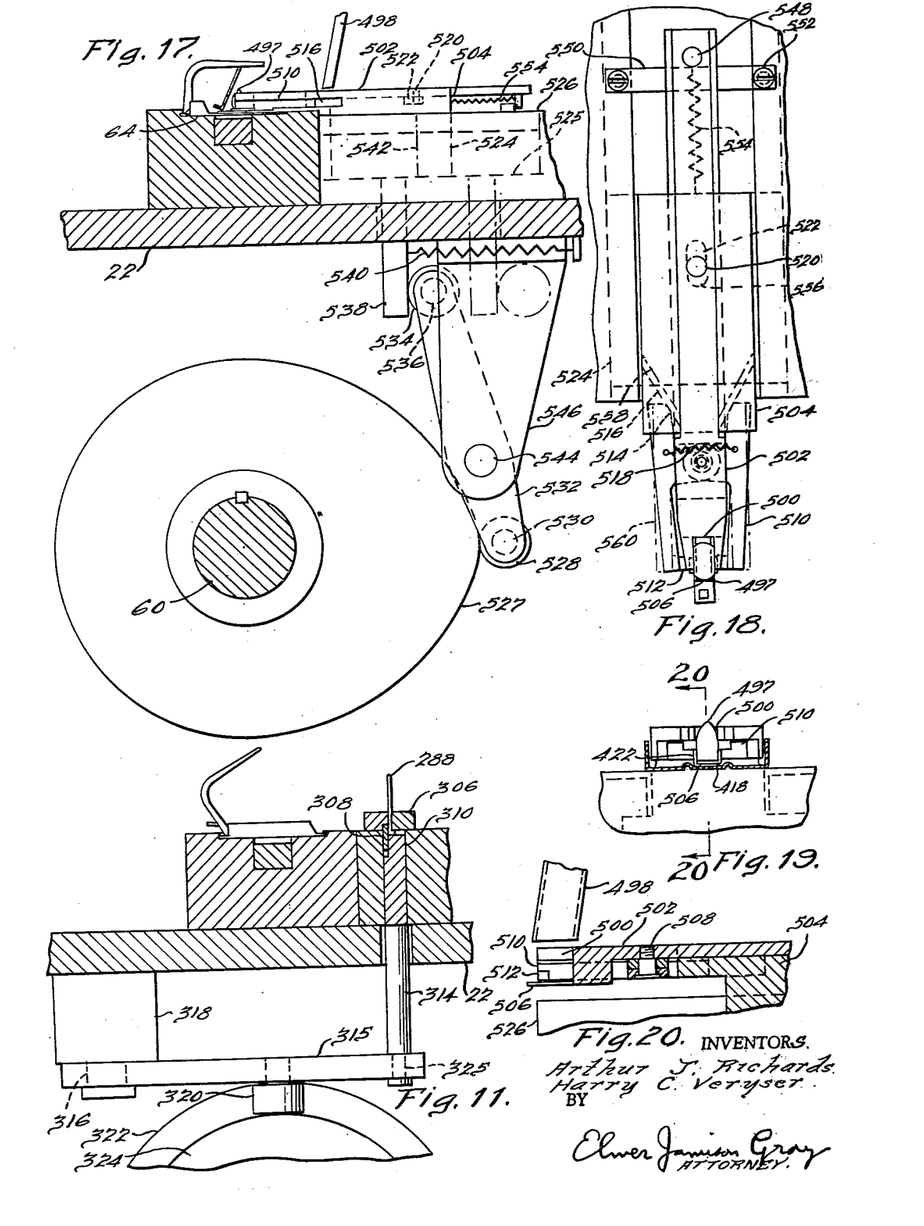
FIG. 11 is a sectional view taken through the line 11—11 of FIG. 10 looking in the direction of the arrows.
FIG. 17 is a section taken through the line 17—17 of FIG. 2 and looking in the direction of the arrows.
FIG. 18 is a full scale view of a portion of the apparatus shown in FIG. 17.
FIG. 19 is an end view of the mechanism shown in FIG. 18 with a sectional view of the trap mechanism.
FIG. 20 is a section taken through the line 20—20 of FIG. 19 and looking in the direction of the arrows.

The third assembling station of the machine places a retainer member or support 288 in position. The support, FIGS. 10 and 11, has a square shaped opening 290 and notched at both top edges to form shoulders 292. The bottom of the lateral edges are notched at 294 with the notch extending into the base portion 296. A tongue 298 extends downwardly and slightly outwardly for purpose later to be described. The portion 296 is notched at 300. Adjacent supports are connected together as at 302 to form a continuous retainer member strip 304.

The retainer member or the support 288 is fabricated from a strip of metal on a press in the same manner as previously described for the base 64 and fed to the machine in the form of a strip 304 also is previously described. It is guided to a position as shown by dot and dash line 305 in FIG. 9 by guide strips 306, FIG. 11. Pawl 308 advances strip 304, the pawl being attached to slide block 310 by pin 312. Rod 314 is attached to block 310 and to a lever 315 pivoted on a pin 316. The pin 316 is secured to bracket 218 that in turn is attached to plate 22. Cam follower 320, attached to lever 315, bears against cam segment 322. Cam segment 322 is attached to the face of cam 324. Pin 325 connects the rod 314 to the lever.

The retainer member or support 288 is moved in to the position as shown by the dot and dash lines 305 at the same time a base 64 is advanced into position. At this time bar 328 is in the position shown by dot and dash lines 330. Bar 328 is attached to slide 332 that is moved on ways 334 that are on guide block 336 also secured to plate 22. Cam 338 provides the movement to the slide 332 through cam follower 340, lever 342, roller 344 and lug 346 attached to the slide 332. Lever 342 pivots on pin 348 attached to bracket 350 that is fastened to the plate 22.

Figures 9, 10, 12:
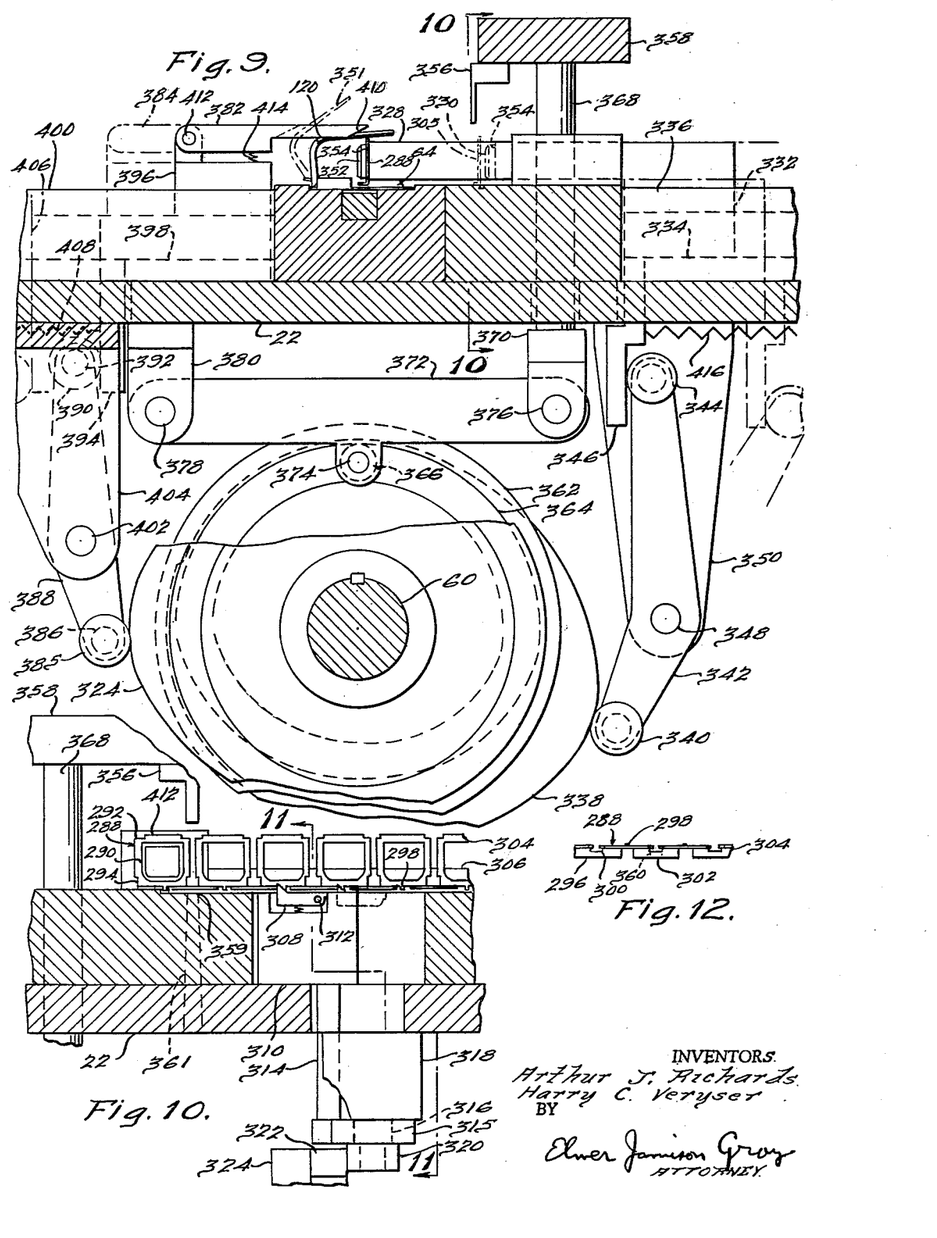
FIG. 9 is a section taken through the line 9—9 of FIG. 2 looking in the direction of the arrows.
FIG. 10 is a partial sectional view taken through the line 10—10 of FIG. 9 looking in the direction of the arrows.
FIG. 12 is a top view of the support of the trap mechanism with the supports connected together in a partial strip.

After the base with the cover assembled in the position shown by dot and dash lines 351 is in position the bar 328 is advanced until the end 352 enters the opening 290 in the retainer member strip with the shoulder 354 abutting against the support. The motion of the bar 328 is then stopped. Punch 356 attached to head 358 then comes down and severs a retainer member from the strip by shearing the metal at the dotted lines 360 as indicated in FIG. 12. The slug drops down through the die 359 and slots 361 where it is carried away from the machine. After separating the retainer member from the strip the punch returns to its starting position. Cam 362 attached to shaft 60 has the groove 364. Cam follower 366 rides in groove 364 that is profiled to move head 358 upward and downward by means of draw bars 368 attached to bracket 370 and lever 372. The follower 366 rotates on shaft 374 attached to the lever 372 which pivots on pins 376 and 378. Pin 378 is attached to bracket 380 that is secured to plate 22.

After the punch has moved upward, rod 328 continues its movement and carries the retainer or support member into position on the base with portion 296 of the support member resting on upraised portions 82 of the base. At this time closer bar 382 is advanced from the position shown in the dot and dash lines 384 by means of the cam 324. Follower 385 turns on shaft 386 attached to lever 388. Roller 390 pivots on pin 392 that pushes against the lug 394 secured to slide 396. The slide moves on ways 398 on guide block 400 in turn secured to plate 22. Lever 388 pivots on pin 402 attached to bracket 404 with the bracket also secured to plate 22. The profile of the cam 324 advances the slide and allows the slide to be retracted to the position of the dot and dash lines 406, by the spring indicated at 408.

Closer 382 advances with the surface 410 engaging the rounded portion 120 of the cover 118 pushing the cover over against the support 288. The top portion 412 of the support enters slots 124 on the cover with the cover resting on shoulders 292 of the support.

Closer 382 pivots on pin 412 with the spring 414 tensioned to urge the closer downward. With the cover in closed position the closer retracts to the position shown by dot and dash lines 384. The cam 338 then allows the spring 416 to retract the bar 328 to the position shown by the dot and dash lines 330. The cams 324, 338, 362 are all secured to the shaft 60 and cam segment 322 is secured to cam 324 so that the profile of the cams and the position of the cams in relation to each other and with cam 96 operate the assembly mechanism with the motion and timing necessary to accomplish the operations described.

Figure 14:
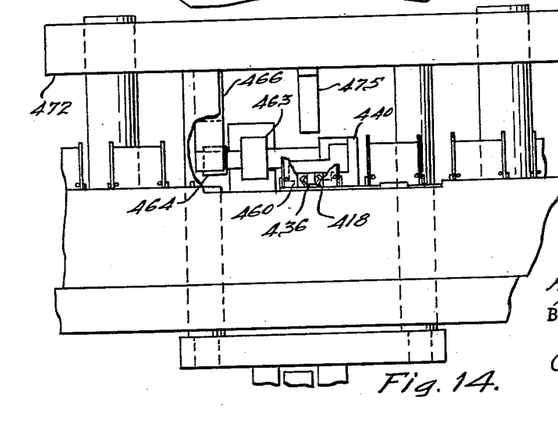
FIG. 14 is a side view of the mechanism looking in the direction of the arrows 14—14 of FIG. 13.
Figures 15, 16:
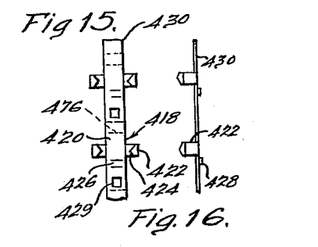
FIG. 15 is a top view of the bait holder of the trap mechanism showing the holders in a partial strip.
FIG. 16 is a side view of a strip shown in FIG. 15.

The fourth assembly station moves a bait holder strip 418 into position. This bait holder strip, FIGS. 14, 15, and 16, has a flat portion 420 with a series of spaced prongs 422 projecting upwardly from each side. Each prong 422 projects outward then inwardly to terminate in a sharp point 424. Portions 426 of the bait holder strip are struck downward to form abutments 428 extending slightly below the bottom surface of the flat portion 420. Apertures 429 are provided in this flat portion.

The bait holders are fabricated from a strip of metal on a progressive type die in the same manner as previously described for the base 64 and fed to the machine 20 in the form of a strip 430 also in the same manner. The strip 430 is guided by guide blocks 431. The base 64 with cover 118 and support 288 in place as shown by the full line in FIG. 9 is moved into position by cam 96. Pawl 432 is in the position shown by the dot and dash lines 434 while the base is advancing into position. The pawl 432 has a pointed portion 436 that abuts the struck down portion 426 of the bait holder to move the bait holder toward the base. The pawl pivots on pin 438 that is attached to a bar 440 secured to slide 442 that moves on ways 444. The ways are on guide block 446 secured to plate 22. Cam 448 moves the slide block forward through cam follower 450, lever 452 and roller 455 that pushes against lug 456 attached to the slide. The profile of the cam allows the spring 458 to retract the slide to the position of the dot and dash lines 459. Lever 452 pivots on pin 453 attached to bracket 454 secured to plate 22.

Figure 4:
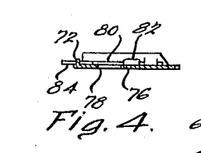
FIG. 4 is a sectional view taken through the line 4—4 of FIG. 3 and looking in the direction of the arrows.

After the base 64 is in position the pawl 432 moves the bait holder 418 into position. As the bait holder moves forward projecting portion 460 on the pawl contacts the support 288. At this time tongue 298 on the support is over aperture 429 in the holder. The pawl 432 continues moving both the holder and support simultaneously until the abutment 428 on the holder drops into the aperture 76 in the base. During this time the support 288 is moved across raised portion 82 on the base by contact with portion 460 and onto raised portion 80 on the base. As best seen in FIG. 4 portion 80 is lower than 82 which allows tongue 298 to drop into aperture 429 when the support 288 moves from portions 82 to 80.

The tension of the spring 84 tries to move the support away from the holder through pressure on the cover. The support is prevented from moving by the tongue 298 resting in the aperture of the bait holder. The bait holder is prevented from moving by the abutment 428 that rests in the aperture 76 in the base. Slot 78 on the base provides clearance for the terminal end of the tongue 298 that projects slightly through the aperture 429 in the holder 418.

Figure 13:
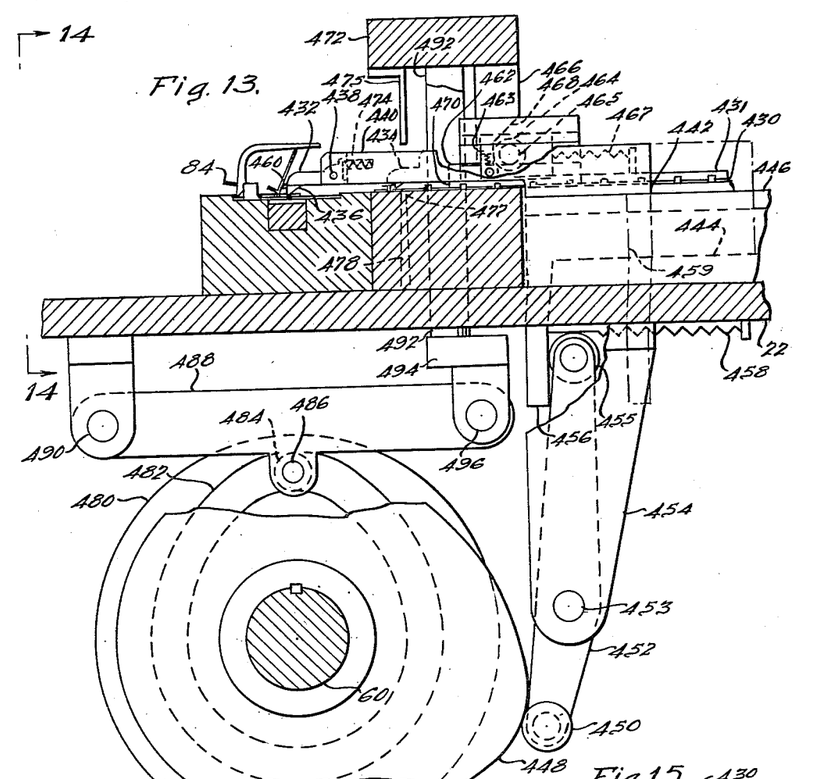
FIG. 13 is a section taken through the line 13—13 of FIG. 2 and looking in the direction of the arrows.

While the pawl 432 is in the forward position another bait holder on the strip 430 is moved forwardly by the pawl 462. Pawl 462 is attached to slide block 463. Cam follower 464 rotates on pin 465 that is attached to the slide block. Cam 466 allows spring 467 to move the block 463 forward and cam surface 468 retracts the block to a position to where it is ready to move the following bait holder forward. Pointed projection 470 on the pawl pushes against the aperture 429 on the holder. The cam 466 is securely fastened to head 472. With the following bait holder of the strip in the forward position the pawl 432 returns to the position shown by the dot and dash lines 434 and spring 474 urges the portion 436 into the projection 426. After the pawl 432 is in the position shown by dot and dash lines 434 punch 475 secured to head 472 (FIG. 13) moves downward with the head to sever the holder from the strip 430 by shearing away the metal as indicated by dotted lines 476. The sheared slugs drop through the die member 477 and aperture 478 and are carried away from the machine.

Cam 480 has cam groove 482. Cam follower 484 rotates on shaft 486 attached to a lever 488 pivoted on a pin 490. Draw bars 492 are secured to head 472 and bracket 494. Lever 488 is pivotally connected to bracket 494 by pin 496. Cams 448 and 480 are securely attached to shaft 69 and with cam 466 that is actuated through cam 480, have their profiles developed and are positioned in timed relation with each other and with cam 96 to operate the assembly mechanism with the motions and timing necessary to accomplish the operations described.

At the fifth assembly station of the machine, FIGS. 17, 18, 19 and 20, the bait is placed in position on the bait holder. A kernel of corn 497 has been found to be very satisfactory as a bait for the trap and by screening, kernels of uniform size can be obtained. The corn is fed by a suitable feed apparatus (not shown) to a chute 498 to where it drops down into a pocket 500 of the assembly apparatus. At this time the pocket 500 is in a retracted position under the chute 498. When the pocket 500 is in the retracted position the base 64 is being moved into position at the assembly station in the manner as previously described.

Slide bar 502 has the pocket 500 at one terminal end and slides in dovetail ways in block 504. A thin elongated portion 506 of the bar 502 forms the bottom of the pocket. Attached to the bar by a shoulder screw 508 are two pincher arms 510 having a projecting portion 512 at one terminal end and a cam follower surface 514 adjacent the opposite end. The cam follower surface 514 rides on cam surface 516 of block 504. Spring 518 holds the cam follower against the cam. A pin 520 secured to the slide bar 502 moves in slot 522 formed in the block 504. Block 504 is secured to slide member 524. Member 524 slides in ways 525 in guide block 526 securely attached to plate 22.

After a base with a bait holder assembled is in position the assembly mechanism is moved by the cam 527. Follower 528 rotates on shaft 530 and the shaft is attached to lever 532. Roller 534 rotating on shaft 536 pushes against lug 538, the lug being secured to member 524. The cam allows the spring 540 to retract the member to the position indicated by the dot and dash lines 542 placing the pocket below the chute. Lever 532 rotates on pin 544 that is attached to bracket 546 which in turn is secured to plate 22.

Bar 502 holding the corn in the pocket 500 moves forward through the action of the cam 527 until the corn is in a position between the prongs 422 of the bait holder 418 that is in the assembled position on the base. At this time the pin 548 that is secured to the bar 502 contacts stop member 550. The stop member is securely fastened by screws 552 to block 526. Up to this time the spring 554 holds bar 502 in a retracted position in relation to the block 504 with the pin 520 against the end 556 of the slot. With the bar 502 in this relative position to the slot 522 cam surface 516 will be in the position indicated by the dot and dash lines 558. Spring 518 holds the pincher arms 510 in the position indicated by dot and dash lines 560. In this position of the arms portions 512 are far enough apart to be positioned adjacent the prongs 422 on the holder. The prongs are in the position shown in FIG. 14.

The cam 527 continues to move the block 504 with the slide 502 arrested by the stop 550. Cam surfaces 516 pressing against the follower surfaces 514 move the portions 512 together forcing the pointed portions 424 of the prongs into the kernel of corn. Prior to assembling, the corn is soaked in heated water of approximately boiling temperature to soften the hard kernels to facilitate the piercing of the corn by the prongs. It will be noted that the thin elongated portion 506 lies over the flat surface 420 of the bait holder so that the projection 428 on the holder remains in position in aperture 76 of the base when the prongs are being forced into the corn.

After the prongs are secured in the corn the cam 527 allows the spring 540 to retract the assembly mechanism to where the pocket 500 is in position under the chute 498 and another kernel of corn drops into the pocket. As the slide begins to move backward the cams 516 retract and allow the pinchers 510 to open and the spring moves bar 502 forward in relation to the block 504 until pin 520 contacts surface 556 of the slot. Cam 527 is secured to shaft 69 so that the profile of the cam is in a position in relation to cam 96 to operate the assembly mechanism with the motion and timing necessary to accomplish the operations described.

Figures 21, 22:
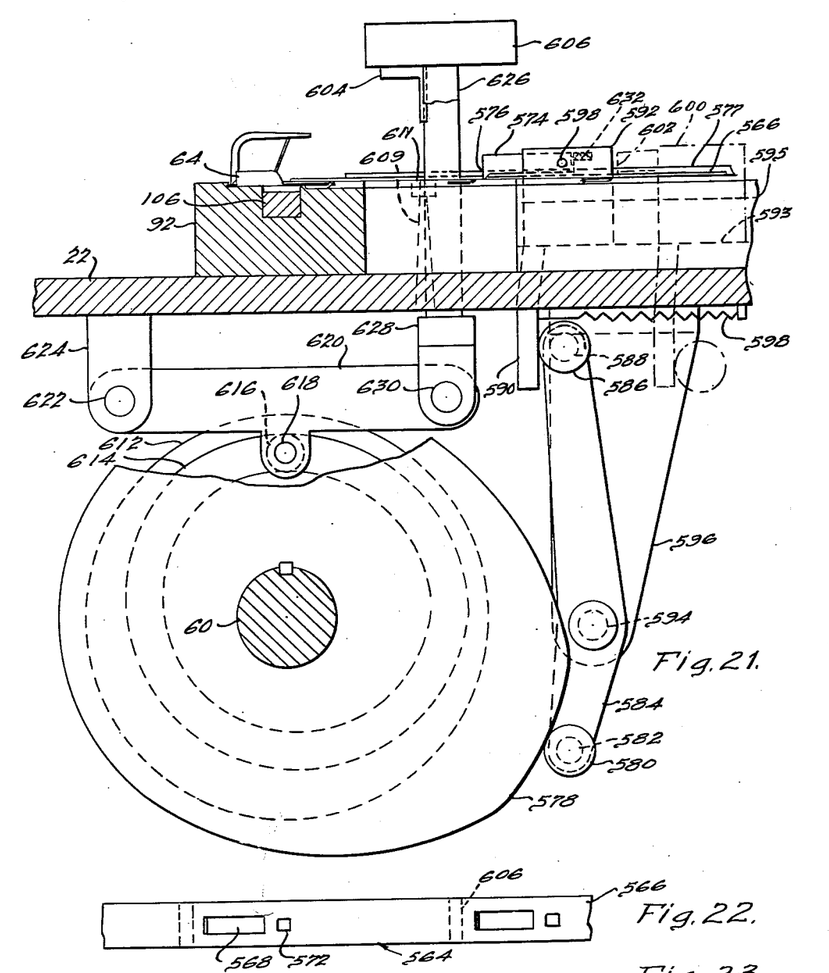
FIG. 21 is a section taken through the line 21—21 of FIG. 2 and looking in the direction of the arrows.
FIG. 22 is a top view of the safety member of the trap mechanism showing the members connected together in a partial strip.
Figure 23:
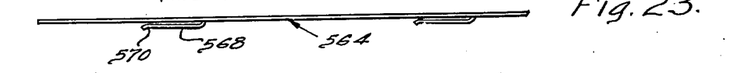
FIG. 23 is a side view of the strip shown in FIG. 22.

The sixth assembly station assembles the safety member 564 into position as seen in FIG. 21. The safety member is fabricated from a strip of metal in the same manner as previously described for the base member 64 and fed to the machine in a continuous strip 566 also in the same manner. Member 564 has a struck out portion 568 with the terminal end of the portion bent slightly downward as at 570. Aperture 572 extends through the member 564.

Pawl 574 has a projecting portion 576 that is adapted to project into the aperture 572 of the safety member. The pawl is actuated by cam 578. Follower 580 rotates on shaft 582 that is attached to lever 584. Roller 586 rotates on shaft 588 that is also attached to lever 584. Roller 586 acts against lug 590 that is secured to slide 592. Lever 584 pivots on pin 594 and the pin is secured to bracket 596 that is secured to plate 22. The slide moves on ways 593 that are on guide block 595 secured to plate 22.

The pawl 574 pivots on pin 598 that is attached to slide 592. Cam 578 allows spring 598 to retract the slide 592 to the position as shown by dot and dash lines 600. With a base 64 in position the slide 592 is moved forward from the position shown by the dot and dash lines 600 to the position shown in full lines (FIG. 21). The pawl is also moved from the position of the dot and dash lines indicated at 602 to the position of the full lines.

Figure 24:
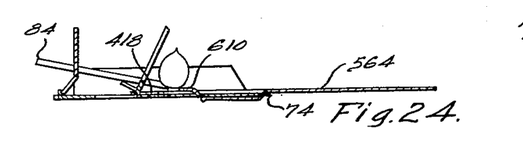
FIG. 24 is a section through the trap mechanism showing the safety member in position.

The portion 576 of the pawl pushing against the aperture 572 of the safety member moves the strip 566 along the guide 577 until the leading safety member is in assembled position as best seen in FIG. 24. After the member 564 is in position the cam 578 allows the pawl to be returned to the position of the dotted lines 602 where the portion 576 is urged into the aperture 572 of a following safety member by the spring 632. Notch 74 in the base 64 helps hold the safety member 564 in position.

Punch 604 secured to head 606 then moves downward and separates the safety member from the strip by shearing a piece of metal from the strip as indicated by dotted lines 608 (FIG. 22). The slug of metal drops down the slot 609 where it is carried away from the machine.

As the punch shears the metal from the strip it also forms the end of the member concave upward as at 610 by a suitable die member 611. In the assembled position the concave portion of the safety member overlies the end of the bait holder to keep the bait holder in fixed position against displacement during handling and shipping to prevent accidental springing of the trap.

The head 606 is actuated by cam 612 having a groove 614. The cam follower 616 runs in the groove and rotates on a shaft 618 secured to lever 620 which pivots on pin 622. The pin is attached to bracket 624 which is secured to the plate 22. Draw bars 626 are secured to head 606 on one end and to cross member 628 at their opposite end. The cross member is attached to lever 620 through pin 630. After the safety member is sheared or severed from the strip the cam 612 moves the punch 604 upwards to the retracted position.

Cams 578 and 612 are secured to shaft 60 so that the profile of the cams in relation to each other and to cam 96 operates the assembly mechanism with the motion and timing necessary to accomplish the operations described.

Figure 1:
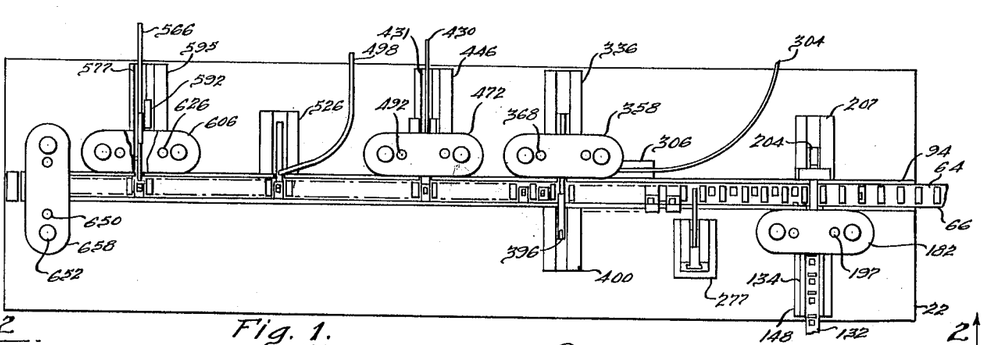
FIG. 1 shows a plan view of the assembly apparatus.
Figure 2:
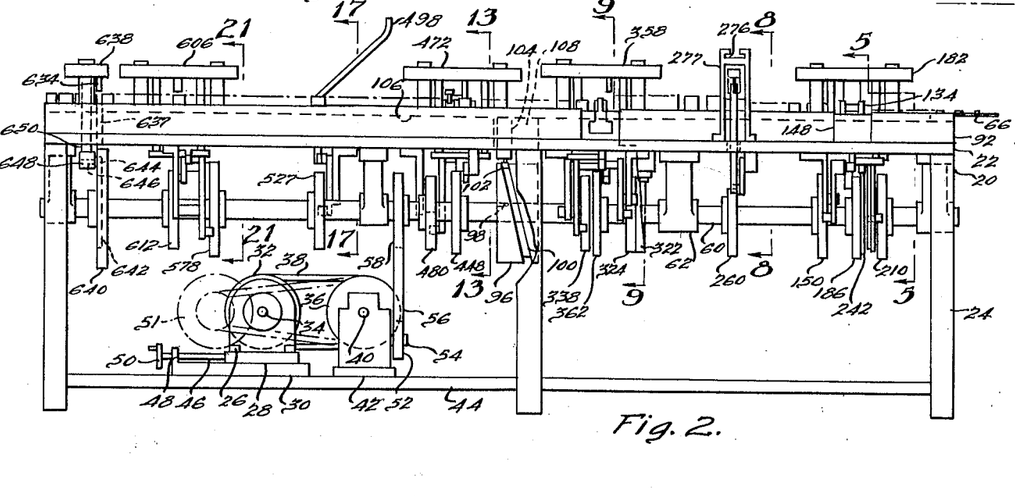
FIG. 2 is a side view of the apparatus looking in the direction of the arrows 2—2 of FIG. 1.
Figure 3:
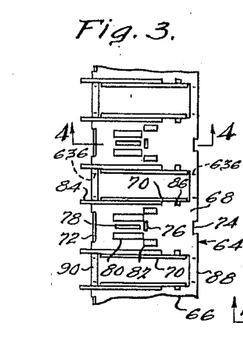
FIG. 3 is a plan view of the base of the trap mechanism with the bases connected together in a partial strip.

The final station of the machine severs the base strip 66 so as to separate a lower jaw member therefrom and thereby release an assembled trap mechanism from the strip 66. This is accomplished by a punch 634 as best seen in FIG. 2 shearing the metal indicated by the dotted lines 636 FIG. 3. The slugs fall through the slot 637. Up to this station the bases or lower jaw members are connected together and moved along the machine by the rod 106 and pawls 110 actuated by cam 96 with each revolution of the shaft advancing the bases a distance equal to the width of one base plus the distance of the width of the strips 88 and 90 that is sheared out to separate the bases. Each of the assembly stations and the final station are positioned on the plate 22 of the machine in relation to the strip so that the part that each station is assembling will move into its proper position on the base which is in register with the station.

Punch 634 is secured to head 638. Cam 640 has a groove 642. Cam follower 644 runs in groove 642. The follower rotates on shaft 646 that is secured to cross member 648. Draw bars 650 are secured to the member 648 and head 638 on which punch 634 is attached. The head 638, 182, 358, 472 and 606 are guided by guide bars 652 in their movements downward and upward.

With each revolution of the shaft 60 an assembled trap mechanism will come off of the last station of the machine. After the bases have been severed from the strip they are ejected from the last station by being pushed along by a follow mechanism onto a conveyor (not shown) that carries them away from the machine.

By means of the mechanism that drives the shafts 60 the speed in revolutions of the shaft can be varied. With one trap mechanism being assembled by the machine with each revolution of the drive shaft the output in assembled traps produced by the machine can be varied, within the operating limits of the apparatus.

All of the assembly operations described take place during one complete revolution of the drive shaft. The strip of base portions of the trap mechanism is advanced by the cam 96 that is secured to the drive shaft. The cams or group of cams that provide the movements for each assembly station are timed in relation to each other and each group of cams or cam is in timed relation to cam 96 that advances the strip comprising the base portions.

The foregoing described apparatus provides a machine that is compact and has one source of power preferably an electric motor. All the moving elements of this apparatus derive their source of movement from the shaft that is driven by the source of power. Thus the timing and movements of all the movable elements can be synchronized by the rotation of the shaft. By having the component parts of the trap mechanism connected together in strip form and moving the strip into position where the parts are severed from the strip and assembled, by mean sactuated from the same shaft, allows the feed of the strips to be synchronized with the other elements of the apparatus.

The foregoing apparatus and its mode of operation has been described for carrying out the operations for the assembly of a trap mechanism having the number of parts and of the type shown. It will be appreciated that the apparatus can be adapted to the assembly of a mechanism having fewer or more parts and differing in type and still come within the scope of the invention.

What is claimed is:

1. In an apparatus wherein component elements of a rodent trap or the like are fed and guided into assembly relation, the combination of guide means extending longitudinally through the apparatus in a generally horizontal direction for guiding a continuous lower jaw member base strip forming a series of similar trapping jaw members joined together, means for advancing said jaw member base strip step by step along said guide means, a second guide means extending in a generally horizontal direction for guiding a continuous upper jaw member strip forming a series of upper trapping jaw members joined together, means for feeding the upper jaw member strip step by step into successive positions above said base strip for the joinder of a pair of upper and lower jaw members, and means for severing the upper jaw member from its strip when in assembled relation to the jaw member of the base strip.

2. In an apparatus wherein component elements of a rodent trap or the like are fed and guided into assembly relation, the combination of guide means extending longitudinally through the apparatus in a generally horizontal direction for guiding a continuous lower jaw member base strip forming a series of similar trapping jaw members joined together, means for advancing said jaw member base strip step by step along said guide means, a second guide means extending in a generally horizontal direction for guiding a continuous upper jaw member strip forming a series of upper trapping jaw members joined together, means for feeding the upper jaw member strip step by step into successive positions above said base strip for the joinder of a pair of upper and lower jaw members, means for severing the upper jaw member from its strip when in assembled relation to the jaw member of the base strip, a third guide means extending in a generally horizontal direction for guiding a continuous retainer member strip forming a series of jaw retainer members joined together, means for feeding said retainer member strip step by step into successive severing positions, and means for severing a retainer member from the strip preparatory to feeding the severed member into position between the upper and lower jaw members.

3. In an apparatus wherein component elements of a rodent trap or the like are fed and guided into assembly relation, the combination of guide means extending longitudinally through the apparatus in a generally horizontal direction for guiding a continuous lower jaw member base strip forming a series of similar trapping jaw members joined together, means for advancing said jaw member base strip step by step along said guide means, a second guide means extending in a generally horizontal direction for guiding a continuous upper jaw member strip forming a series of upper trapping jaw members joined together, means for feeding the upper jaw member strip step by step into successive positions above said base strip for the joinder of a pair of upper and lower jaw members, means for severing the upper jaw member from its strip when in assembled relation to the jaw member of the base strip, a third guide means extending in a generally horizontal direction for guiding a continuous retainer member strip forming a series of jaw retainer members joined together, means for feeding said retainer member strip step by step into successive severing positions, means for severing a retainer member from the strip, and means for feeding the severed retainer member into an upright position between the spaced upper and lower jaw members.

4. In an apparatus wherein component elements of a rodent trap or the like are fed and guided into assembly relation, the combination of guide means extending longitudinally through the apparatus in a generally horizontal direction for guiding a continuous lower jaw member base strip forming a series of similar trapping jaw members joined together, means for advancing said jaw member base strip step by step along said guide means, a second guide means extending in a generally horizontal direction for guiding a continuous upper jaw member strip forming a series of upper trapping jaw members joined together, means for feeding the upper jaw member strip step by step into successive positions above said base strip for the joinder of a pair of upper and lower jaw members, means for severing the upper jaw member from its strip when in assembled relation to the jaw member of the base strip, a third guide means extending in a generally horizontal direction for guiding a continuous retainer member strip forming a series of jaw retainer members joined together, means for feeding said retainer member strip step by step into successive severing positions, means for severing a retainer member from the strip preparatory to feeding the severed member into position between the upper and lower jaw members, means for guiding in the direction of said retainer member a continuous bait holder strip forming a series of bait holders joined together, and means for feeding said bait holder strip into position for connection to the retainer member and for the severance of a bait holder therefrom.

5. In an apparatus wherein component elements of a rodent trap or the like are fed and guided into assembly relation, the combination of guide means extending longitudinally through the apparatus in a generally horizontal direction for guiding a continuous lower jaw member base strip forming a series of similar trapping jaw members joined together, means for advancing said jaw member base strip step by step along said guide means, a second guide means extending in a generally horizontal direction for guiding a continuous upper jaw member strip forming a series of upper trapping jaw members joined together, means for feeding the upper jaw member strip step by step into successive positions above said base strip for the joinder of a pair of upper and lower jaw members, means for severing the upper jaw member from its strip when in assembled relation to the jaw member of the base strip, a third guide means extending in a generally horizontal direction for guiding a continuous retainer member strip forming a series of jaw retainer members joined together, means for feeding said retainer member strip step by step into successive severing positions, means for severing a retainer member from the strip, means for feeding the severed retainer member into an upright position between the spaced upper and lower jaw members, means for guiding in the direction of said retainer member a continuous bait holder strip forming a series of bait holders joined together, and means for feeding said bait holder strip into position between said jaw members for connection to the retainer member and for the severance of a bait holder therefrom.

6. In an apparatus wherein component elements of a rodent trap or the like are fed and guided into assembly relation, the combination of guide means extending longitudinally through the apparatus in a generally horizontal direction for guiding a continuous lower jaw member base strip forming a series of similar trapping jaw members joined together, means for advancing said jaw member base strip step by step along said guide means, a second guide means extending in a generally horizontal direction for guiding a continuous upper jaw member strip forming a series of upper trapping jaw members joined together, means for feeding the upper jaw member strip step by step into successive positions above said base strip for the joinder of a pair of upper and lower jaw members, means for severing the upper jaw member from its strip when in assembled relation to the jaw member of the base strip, a third guide means extending in a generally horizontal direction for guiding a continuous retainer member strip forming a series of jaw retainer members joined together, means for feeding said retainer member strip step by step into successive severing positions, means for severing a retainer member from the strip preparatory to feeding the severed member into position between the upper and lower jaw members, means for guiding in the direction of said retainer member a continuous bait holder strip forming a series of bait holders joined together, means for feeding said bait holder strip into interlocking relation to the lower end of said retainer member and also into releasable interlocking connection with said base strip, and means for severing a bait holder from said bait holder strip.

7. In an apparatus wherein component elements of a rodent trap or the like are fed and guided into assembly relation, the combination of guide means extending longitudinally through the apparatus in a generally horizontal direction for guiding a continuous lower jaw member base strip forming a series of similar trapping jaw members joining together, means for advancing said jaw member base strip step by step along said guide means, a second guide means extending in a generally horizontal direction for guiding a continuous upper jaw member strip forming a series of upper trapping jaw members joined together, means for feeding the upper jaw member strip step by step into successive positions above said base strip for the joinder of a pair of upper and lower jaw members, means for severing the upper jaw member from its strip when in assembled relation to the jaw member of the base strip, a third guide means extending in a generally horizontal direction for guiding a continuous retainer member strip forming a series of jaw retainer members joined together, means for feeding said retainer member strip step by step into successive severing positions, means for severing a retainer member from the strip, means for feeding the severed retainer member into an upright position between the spaced upper and lower jaw members, means for guiding in the direction of said retainer member a continuous bait holder strip forming a series of bait holders joined together, means for feeding said bait holder strip into interlocking relation to the lower end of said retainer member and also into releasable interlocking relation with said base strip, and means for severing a bait holder from said bait holder strip.

8. In an apparatus wherein component elements of a rodent trap or the like are fed and guided into assembly relation, the combination of guide means extending longitudinally through the apparatus in a generally horizontal direction for guiding a continuous lower jaw member base strip forming a series of similar trapping jaw members joined together, means for advancing said jaw member base strip step by step along said guide means, a second guide means extending in a generally horizontal direction for guiding a continuous upper jaw member strip forming a series of upper trapping jaw members joined together, means for feeding the upper jaw member strip step by step into successive positions above said base strip for the joinder of a pair of upper and lower jaw members, means for severing the upper jaw member from its strip when in assembled relation to the jaw member of the base strip, a third guide means extending in a generally horizontal direction for guiding a continuous retainer member strip forming a series of jaw retainer members joined together, means for feeding said retainer member strip step by step into successive severing positions, means for severing a retainer member from the strip, means for feeding the severed retainer member into an upright position between the spaced upper and lower jaw members, means for guiding in the direction of said retainer member a continuous bait holder strip forming a series of bait holders joined together, means for feeding said bait holder strip into interlocking relation to the lower end of said retainer member and also into releasable interlocking relation with said base strip, means for severing a bait holder from said bait holder strip, and means for feeding bait into said bait holder.

9. In an apparatus wherein component elements of a rodent trap or the like are fed and guided into assembly relation, the combination of guide means extending longitudinally through the apparatus in a generally horizontal direction for guiding a continuous lower jaw member base strip forming a series of similar trapping jaw members joined together, means for advancing said jaw member base strip step by step along said guide means, a second guide means extending in a generally horizontal direction for guiding a continuous upper jaw member strip forming a series of upper trapping jaw members joined together, means for feeding the upper jaw member strip step by step into successive positions above said base strip for the joinder of a pair of upper and lower jaw members, means for severing the upper jaw member from its strip when in assembled relation to the jaw member of the base strip, a third guide means extending in a generally horizontal direction for guiding a continuous retainer member strip forming a series of jaw retainer members joined together, means for feeding said retainer member strip step by step into successive severing positions, means for severing a retainer member from the strip preparatory to feeding the severed member into position between the upper and lower jaw members, means for guiding in the direction of said retainer member a continuous bait holder strip forming a series of bait holders joined together, means for feeding said bait holder strip into position for connection to the retainer member and for the severance of a bait holder therefrom, and means for feeding bait into said bait holder.

10. In an apparatus wherein component elements of a rodent trap or the like are fed and guided into assembly relation, the combination of guide means extending longitudinally through the apparatus in a generally horizontal direction for guiding a continuous lower jaw member base strip forming a series of similar trapping jaw members joined together, means for advancing said jaw member base strip step by step along said guide means, a second guide means extending in a generally horizontal direction for guiding a continuous upper jaw member strip forming a series of upper trapping jaw members joined together, means for feeding the upper jaw member strip step by step into successive positions above said base strip for the joinder of a pair of upper and lower jaw members, means for severing the upper jaw member from its strip when in assembled relation to the jaw member of the base strip, a third guide means extending in a generally horizontal direction for guiding a continuous retainer member strip forming a series of jaw retainer members joined together, means for feeding said retainer member strip step by step into successive severing positions, means for severing a retainer member from the strip preparatory to feeding the severed member into position between the upper and lower jaw members, means for feeding a bait holder strip into position for connection to the lower end of the retainer member, means for severing a bait holder from said bait holder strip, and means for feeding bait into the bait holder.

11. An apparatus according to claim 8 having means shiftable into position to overlie a portion of the bait holder and hold the same in fixed position against displacement.

12. An apparatus according to claim 9 having means shiftable into position to overlie a portion of the bait holder and hold the same in fixed position against displacement.

13. An apparatus according to claim 10 wherein a safety member strip is fed into assembled position with a portion thereof overlying a portion of the bait holder, and means for severing said safety member from the strip.

14. An apparatus according to claim 7 wherein a safety member strip is fed into assembled position with a portion thereof overlying a portion of the bait holder, and means for severing said safety member from the strip.

15. An apparatus according to claim 10 wherein means adjacent to the end of said guide means is provided for severing the base strip and separating a lower jaw member therefrom.

16. An apparatus according to claim 3 wherein means adjacent to the end of said guide means is provided for severing the base strip and separating a lower jaw member therefrom.

17. In an apparatus wherein component elements of a rodent trap or the like are fed and guided into assembly relation, the combination of guide means extending longitudinally through the apparatus in a generally horizontal direction for guiding a continuous lower jaw member base strip forming a series of similar trapping jaw members joined together, reciprocable means for advancing said jaw member base strip step by step along said guide means, a second guide means extending in a generally horizontal direction transversely of said first named guide means for guiding a continuous upper jaw member strip forming a series of upper trapping jaw members joined together, reciprocable means for feeding the upper jaw member strip step by step into successive positions above said base strip for the joinder of a pair of upper and lower jaw members, and means for severing the upper jaw member from its strip when in assembled relation to the jaw member of the base strip.

18. In an apparatus wherein component elements of a rodent trap or the like are fed and guided into assembly relation, the combination of guide means extending longitudinally through the apparatus in a generally horizontal direction for guiding a continuous lower jaw member base strip forming a series of similar trapping jaw members joined together, means for advancing said jaw member base strip step by step along said guide means, a second guide means extending in a generally horizontal direction for guiding a continuous upper jaw member strip forming a series of upper trapping jaw members joined together, means for feeding the upper jaw member strip step by step into successive positions above said base strip for the joinder of a pair of upper and lower jaw members, means for severing the upper jaw member from its strip when in assembled relation to the jaw member of the base strip, a third guide means extending in a generally horizontal direction similar to the first guide means for guiding a continuous retainer member strip forming a series of jaw retainer members joined together, means for feeding said retainer member strip step by step into successive severing positions, and means for severing a retainer member from the strip preparatory to feeding the severed member into an upright position between the upper and lower jaw members.

19. In an apparatus wherein component elements of a rodent trap or the like are fed and guided into assembly relation, the combination of an elongated support, means for guiding a continuous strip of part receiving lower jaw base elements along said support, means for intermittently feeding step by step strips of trap component elements toward said continuous strip at successive stations, means for controlling the step by step movement of all of said strips, common power operated means for actuating said controlling means, the latter including means for stopping each of said strips at each station, means to sever a component element from a component strip while said strips are stopped, and means to sever an assembled trap from said base strip subsequent to final assembly of said component elements.

20. In an apparatus wherein sheet metal component elements of a rodent trap or the like are fed and guided into assembly relation, the combination of an elongated support, means for advancing a continuous metal base strip of part receiving lower jaw base elements along said support, means for feeding step by step strips of metallic trap component elements toward said continuous strip at successive stations, a plurality of cam means for controlling the step by step movement of all of said strips, a common power operaed shaft on which said cam means are mounted, said controlling means including means for stopping said base strip at each station, means to sever a component element from a component strip while said base strip is stopped, and means to separate an assembled trap from said base strip subsequent to final assembly of said component elements.

References Cited in the file of this patent

UNITED STATES PATENTS

| | | |
|---|---|---|
| 2,005,375 | Jones | June 18, 1935 |
| 2,332,445 | Grim | Oct. 19, 1943 |
| 2,686,349 | Nijboer | Aug. 17, 1954 |
| 2,707,818 | Page | May 10, 1955 |
| 2,757,447 | Barenyi | Aug. 7, 1956 |
| 2,947,077 | Lazarus | Aug. 2, 1960 |